US008323025B2

(12) United States Patent
Freund et al.

(10) Patent No.: US 8,323,025 B2
(45) Date of Patent: *Dec. 4, 2012

(54) SYSTEM AND METHOD FOR AUTOMATIC DRIVER EVALUATION

(75) Inventors: Barbara Freund, Virginia Beach, VA (US); Ronald K. Freund, Virginia Beach, VA (US)

(73) Assignee: Eastern Virginia Medical School, Norfolk, VA (US)

( * ) Notice: Subject to any disclaimer, the term of this patent is extended or adjusted under 35 U.S.C. 154(b) by 522 days.

This patent is subject to a terminal disclaimer.

(21) Appl. No.: 11/484,614

(22) Filed: Jul. 12, 2006

(65) Prior Publication Data

US 2007/0015117 A1    Jan. 18, 2007

Related U.S. Application Data

(60) Provisional application No. 60/697,950, filed on Jul. 12, 2005.

(51) Int. Cl.
*A61C 11/00* (2006.01)

(52) U.S. Cl. .......................................... 434/65; 434/62

(58) Field of Classification Search .................. 434/350, 434/219, 236, 29–71; 340/576
See application file for complete search history.

(56) References Cited

U.S. PATENT DOCUMENTS

| | | | |
|---|---|---|---|
| 4,034,484 A | 7/1977 | Radice | |
| 4,276,030 A | 6/1981 | Radice | |
| 4,750,888 A | 6/1988 | Allard et al. | |
| 4,846,686 A * | 7/1989 | Adams | 434/69 |
| 5,015,189 A | 5/1991 | Wenzinger | |
| 5,131,848 A | 7/1992 | Adams | |
| 5,269,687 A | 12/1993 | Mott et al. | |
| 5,597,359 A | 1/1997 | Byerly | |
| 5,618,179 A * | 4/1997 | Copperman et al. | 434/69 |
| 5,660,547 A * | 8/1997 | Copperman | 434/29 |
| 5,888,074 A * | 3/1999 | Staplin et al. | 434/258 |
| 2004/0158476 A1* | 8/2004 | Blessinger et al. | 705/1 |
| 2009/0202964 A1* | 8/2009 | Simon | 434/62 |

OTHER PUBLICATIONS

Rizzo, Matthew, et al.—'Demograhic and Driving Perofrmance Factors in Simiulator Adaptive Syndrome'—Proceedings of the Second International Driving Symposium on Human Factors in Driver Assessment, Training, and Vehicle Design (2003).*
International Search Report, pp. 1-2, Aug. 17, 2007.
Freund, B. et al., "Error specific restrictions for older drivers; promoting continued independence and public safety." Accid. Anal. Prev. 40(1), pp. 97-103. Jan. 2008.
Freund, B. et al., "Office based evaluation of the older driver." J. Am. Geriatr. Soc. 54(12), pp. 1943-1944. Dec. 2006.

(Continued)

*Primary Examiner* — Timothy A Musselman
(74) *Attorney, Agent, or Firm* — Wilmer Cutler Pickering Hale and Dorr LLP

(57) ABSTRACT

Embodiments of the present invention provide a system and method for automatic driver evaluation of a person's driving capabilities and render an outcome of pass or fail without the need for a trained observer to evaluate driver's performance. In one embodiment, the automatic driver evaluation system facilitates the display of a predetermined driving route designed for a predetermined demography, observe simulated driving performance of a user on the predetermined driving route, record errors made by the user while performing the simulated drive, and compare the performance errors to at least one threshold value and generate a score based on the comparison.

39 Claims, 3 Drawing Sheets

OTHER PUBLICATIONS

Freund, B., et al., "Recognizing and evaluating potential dementia in office settings." Clin. Geriatr. Med. 20(1), pp. 1-14. Feb. 2004.

Freund, B. et al., "Effects of cognition on driving involvement amongst the oldest old: variations by gender and alternative transportation opportunities." The Gerontologist. 42(5), pp. 621-633. Oct. 2002.

Freund, et al., "In my car the brake is on the right: pedal errors among older drivers," Accid. Anal Prev., 40(1), pp. 403-409. Jan. 2008.

Freund, et al., "Self-rated driving performance among elderly drivers referred for driving evaluation," Accident Analysis & Prevention, 37(4), pp. 613-618. Jul. 2005.

McGehee, D., et al., "Quantitative analysis of steering adaptation on a high performance fixed-base driving simulator." Transportation Research Part F: Traffic Psychology and Behavior. 7(3), pp. 181-196. 2004.

Owlsley, C. et al., "Visual processing impairment and risk of motor vehicle crash among older adults." Jama. 279(14), pp. 1083-1088. 1998.

Preusser, D. et al., "Fatal crash risk for older drivers at intersections." Accid. Anal. and Prev. 30:2, pp. 151-159. 1998.

Rizzo, M., et al., "Simulated Car Crashes at Intersections in Drivers With Alzheimer Disease." Alzheimer Disease & Associated Disorders. 15(1), pp. 10-20. 2001.

Shulman, K.I., "Clock-drawing: Is it the ideal cognitive screening test?" International Journal of Geriatric Psyciatry. 15, pp. 548-561. 2000.

Uc, E., et al., "Unsafe rear-end collision avoidance in Alzheimer's disease," J. Neurological Sciences. 251, pp. 35-43 .2006.

Wallace, R. et al. "Cognitive change, medical illness, and crash risk among older drivers: an epidemiological consideration." Alzheimer Dis. Assoc. Disord. 11:1, pp. 31-37. 1997.

Wang, C. et al. "Older driver safety: a report from the Older Drivers Project." J. Am. Geriatric Soc. 52, pp. 143-149. 2004.

Freund, B. et al. "The older adult driver: issues and concerns for the geriatric clinician." Annals of Long Term Care Clinical Care, 11(9): 37-39 (Sep. 2003) (3 pages).

Freund, B. et al. "Clock drawing test tracks progression of driving performance in cognitively impaired older adults: case comparisons." Clinical Geriatrics, 12(7): 33-36 (Jul. 2004) (6 pages).

Freund, R. et al. "Silicone block interposition for traumatic bone loss." Orthopedics, 23(8): 795-804 (Aug. 2000) (4 pages).

Freund, B et al. "Simulator sickness amongst older drivers with and without dementia." Advances in Transportation Studies, an International Journal, Special Issue, 71-74 (2006) (4 pages).

Freund, B. et al. "Drawing clocks and driving cars, use of brief tests of cognition to screen driving competency in older adults." J. Gen. Intern. Med., 20: 240-244 (2005) (4 pages).

Freund, B., et al. "Continued driving and time to transition to non-driver status through error specific driving restrictions." Gerontology and Geriatrics Education, 29(4): 326-335 (2008) (10 pages).

Freund, B., et al. "Evaluating driving performance of cognitively impaired and healthy older adults: a pilot study comparing on-road testing and driving simulation." JAGS, 50(7): 1309-1310 (2002) (2 pages).

Gravenstein, S., et al. "Surveillance for respiratory illness in long-term care settings: detection of illness using a prospective research technique." JAMDA, 122-128 (May/Jun. 2000) (7 pages).

Petrakos, D., et al. "Driving habits of older drivers three months prior to driving evaluation." Topics in Geriatric Rehabilitation, 25(2): 118-134 (2009) (17 pages).

Risser, M., et al. "Driving simulation performance in the elderly with mild cognitive impairment." Sleep, 23, Abstract Supplement #2, Abstract 1643.H: A210 (Apr. 15, 2000) (2 pages).

* cited by examiner

SYSTEM AND METHOD FOR AUTOMATIC DRIVER EVALUATION

RELATED APPLICATIONS

This application claims the benefit to U.S. Provisional Patent Application No. 60/697,950, filed Jul. 12, 2005.

FIELD OF THE INVENTION

This invention generally relates to a vehicle simulation system, and particularly to a simulator for land vehicles which accurately simulates driving a vehicle in various conditions and which is capable of monitoring and determining the capability of a motor vehicle driver.

BACKGROUND OF THE INVENTION

There is a continuing increase in the density of vehicles traveling the world's roadways. This increase raises the probability of vehicles colliding with objects. Simultaneously, a need to improve the safety of vehicle operations, as it currently stands, by reducing the occurrences of vehicles colliding with stationary and moving objects (such as roadside obstacles and other vehicles) is present. Motor vehicle safety devices have continuously improved over the years and have made driving a safer experience. Many of these safety devices, such as seat belts and air bags are designed to protect occupants in the event of a crash. Other devices, such as anti-lock braking systems are intended to assist the driver's performance to prevent a crash. Such systems assume an alert and competent driver, but this is not always the case. A driver may not be fully alert or capable of making appropriate decisions for any number of reasons. For example, these include drowsiness, talking on a cellular phone, changing the radio stations, dealing with unruly children, mental fatigue, age, medical conditions and the like.

Driving is a complex task and requires a range of cognitive and psychomotor abilities that include memory, judgment, motor control and speed, decision-making, and attention. These skills are necessary for safe driving and often decline as we age. Aging presses the issue of driving competence. Driving places demands on attention, memory, problem solving and information processing, the cognitive faculties that decline with aging. Older drivers crash at a rate second only to the youngest drivers. Older driver involvement in fatal crashes is projected to increase 155% by 2030, accounting for 54% of the total projected increase in fatal crashes among all drivers. As the population ages and the number of older drivers increases, declining driver competence becomes an urgent public health problem and a challenge to recognize impaired driving ability in the elderly.

One means for reconciling these factors is to evaluate a driver's operational performance over time to determine if the driver has lost the capability of operating the vehicle safely. Whenever a driver is responsible for operating a motor vehicle, it is critical that the driver be capable of demonstrating basic cognitive and motor skills at a level that will assure the safe operation of the vehicle. A number of conditions can impair a driver's ability to perform the basic cognitive and motor skills that are necessary for the safe operation of a motor vehicle. It is desirable to evaluate a driver's ability to identify hazardous conditions and correctly react to those conditions while operating a motor vehicle.

Typically, people whose driving capabilities are questioned are evaluated by the Department of Motor Vehicles or an occupational therapist. This requires a human evaluator to ride with the subject and evaluate them based on some criteria. However, road test courses and evaluator training have not been standardized. An evaluator's background and training are variable. This introduces subjectivity and potential bias in that not all road tests are standardized and one cannot control variables such that all subjects will experience the same test or such that all will face specific events that could be a hazard to them. For example, not all drivers would be faced with a pedestrian walking into the path of the vehicle or a car running red light when the driver approaches the intersection with a green light. Further, road tests have relied on the expert opinion of the examiners in which errors are determined either as driving errors that violate the rules of the road or by the judgment of the examiner as to what constitutes an important error. However, some errors are typical of experience drivers (e.g., rolling stop at a stop sign) and may not be relevant to competence decisions. Finally, road tests can be costly and dangerous when the driver is very incompetent.

Laboratory measures, such as neuropsychological tests, have been used to infer poor driving skills based upon poor test performance, but have met with mixed success. While poorer global cognitive performance is associated with impaired driving, the specificity of the neuropsychological measures has been limited. Measures of visual attention and executive function appear to be the most promising of the in-clinic measures. Accident history (often based upon accidents per million miles) has been used to examine whether certain populations are at greater risk for on-road accidents. While this provides a valid measure of "real world" risk, it does not inform individual risks and may over- or underestimate risk depending upon the driving environs.

Lastly, the emergence of driving simulators has provided an opportunity to evaluate under addressed skills such as accident avoidance and navigational abilities, and to experimentally delineate the components of driving performance. Concerns remain regarding their realism and usability in various populations. Fully interactive driving simulator system are also available that puts drivers behind the wheel before they drive on the highway. These simulators provide 3-screens with an expanded field of view for realism. Alternatively, single-screen system are also available that allow drivers to replicate the actions necessary to develop and reinforce driving skills and habits. These typically include a car seat, steering wheel, accelerator, brake pedals, desktop, console, or customized driving controls; regular, wide field-of-view and head-mounted display options; and validated high-fidelity, non-linear, vehicle and tire models. While there is a range of technological sophistication, some automatically record crashes, reaction time, speed, tickets and response to tasks of divided attention, but these simulators do not score and still require a human evaluator to render an opinion as in the road testing.

It would be desirable to have a system that combines a simulator with a method to automatically evaluate a person's driving capabilities and render an outcome of pass or fail without the need for a trained observer to evaluate driver's performance. Accordingly, the present invention is directed to these, as well as other, important ends.

SUMMARY OF THE INVENTION

The present invention provides a system and method for automatic driver evaluation that evaluate a person's driving capabilities and render an outcome of pass or fail without the need for a trained observer to evaluate driver's performance.

Accordingly, the present invention relates to system and method for automatic driver evaluation, which include the operative steps of displaying a predetermined driving route, wherein the predetermined driving route is designed for a predetermined demography, observing simulated driving performance of a user on the predetermined driving route, recording errors made by the user while performing the simulated drive, and comparing the performance errors to at least one threshold value. More specifically, the predetermined driving route includes driving tasks, wherein the driving tasks includes stopping on red light when executing right turns, left turns when there is no oncoming or cross traffic, left turns when there is oncoming traffic, driver has throughway during green lights, driver required to stop at stop-signs, driver required to change lane when there is a reduction in number of lanes, driver required to slow speed to avoid collision when pedestrians are jaywalking, driver required to slow speed to avoid collision when cars pull into path of driver, and driver required to change speeds when speed limit changes.

In an example of the present invention, the performance errors recorded while performing the simulated drive include hazardous errors, traffic violations, or rule violations. Also, the threshold value includes at least one hazardous error, at least two traffic violations, or at least one rule violations and at least one traffic violations.

In another example of the present invention, the method further includes the operative steps of displaying performance outcome as fail if at least one performance error is a hazardous error, displaying performance outcome as fail if the performance errors are at least two traffic violations, and displaying performance outcome as fail if the performance errors are at least one rule violations and at least one traffic violations. More specifically, the hazardous errors comprises crash involving pedestrian, crash involving building, crash involving vehicle, driving in the lane of oncoming traffic, turning from the wrong lane, and unable to maintain lane position; traffic violations comprises running red light, running stop sign, speeding, driving at a speed of at least 10 miles per hour less than the posted speed limit, stopping without reason, and straddling lane for at least 6 seconds; and rule violations comprises failing to turn, turning in direction opposite of command, and poor control of vehicle during divided attention task.

In an example of the present invention, the method further includes the operative step of determining fitness to drive based on the errors made by the user while performing the simulated drive. In one example of the present invention, the errors made by the user while performing the simulated drive is determined for at least 30 minutes or until the completion of the last driving task in the predetermined route. In another example of the present invention, the predetermined driving route is at least one urban course and the predetermined demography comprises 60 years or older.

In another example of the present invention, a system for evaluating driving capabilities of a user in a simulated environment is provided. The system includes a display device configured to display a predetermined driving route, wherein the predetermined driving route is designed for a predetermined demography, a control device configured to observe simulated driving performance of a user on the predetermined driving route, a storage device configured to store errors made by the user while performing the simulated drive, and a comparator configured to compare the performance errors to at least one threshold values. The system according to present invention, further comprises a plurality of input devices for controlling the position of a simulated vehicle in the simulated environment. More specifically the input device comprises accelerator pedal, brake pedals, adjustable seats, throttle, dashboard, and steering wheel. Also, according to the system of the present invention, the display unit provides at least 135 degree angle field of view, wherein the display unit comprises a ceiling mounted digital projector, and at least one screen, or a computer monitor. In an example of the system according to present invention, the simulated environment is a driving cab, wherein the simulated environment comprises at least one desk, at least one chair, modular steering, modular dash, and at least one modular pedal.

In another example, the present invention relates to a computer program product, residing on a computer-readable medium, the computer program product comprising computer instructions for configuring a computer to perform the acts of displaying a predetermined driving route, wherein the predetermined driving route is designed for a predetermined demography, observing simulated driving performance of a user on the predetermined driving route, recording errors made by the user while performing the simulated drive, and comparing the performance errors to at least one threshold value.

In an example of the computer program product of the present invention, wherein the instructions for performing the act of comparing the performance errors to at least one threshold value further comprises the instructions for performing the act of displaying performance outcome as fail if at least one performance error is a hazardous error.

In another example of the computer program product of the present invention, wherein the instructions for performing the act of comparing the performance errors to at least one threshold value further comprises the instructions for performing the act of displaying performance outcome as fail if the performance errors are at least two traffic violations.

In another example of the computer program product of the present invention, wherein the instructions for performing the act of comparing the performance errors to at least one threshold value further comprises the instructions for performing the act of displaying performance outcome as fail if the performance errors are at least one rule violations and at least one traffic violations.

In yet another example of the computer program product of the present invention, wherein the instructions for performing the act of comparing the performance errors to at least one threshold value further comprises the instructions for performing the act of determining fitness to drive based on the errors made by the user while performing the simulated drive.

DETAILED DESCRIPTION

Figure 1:
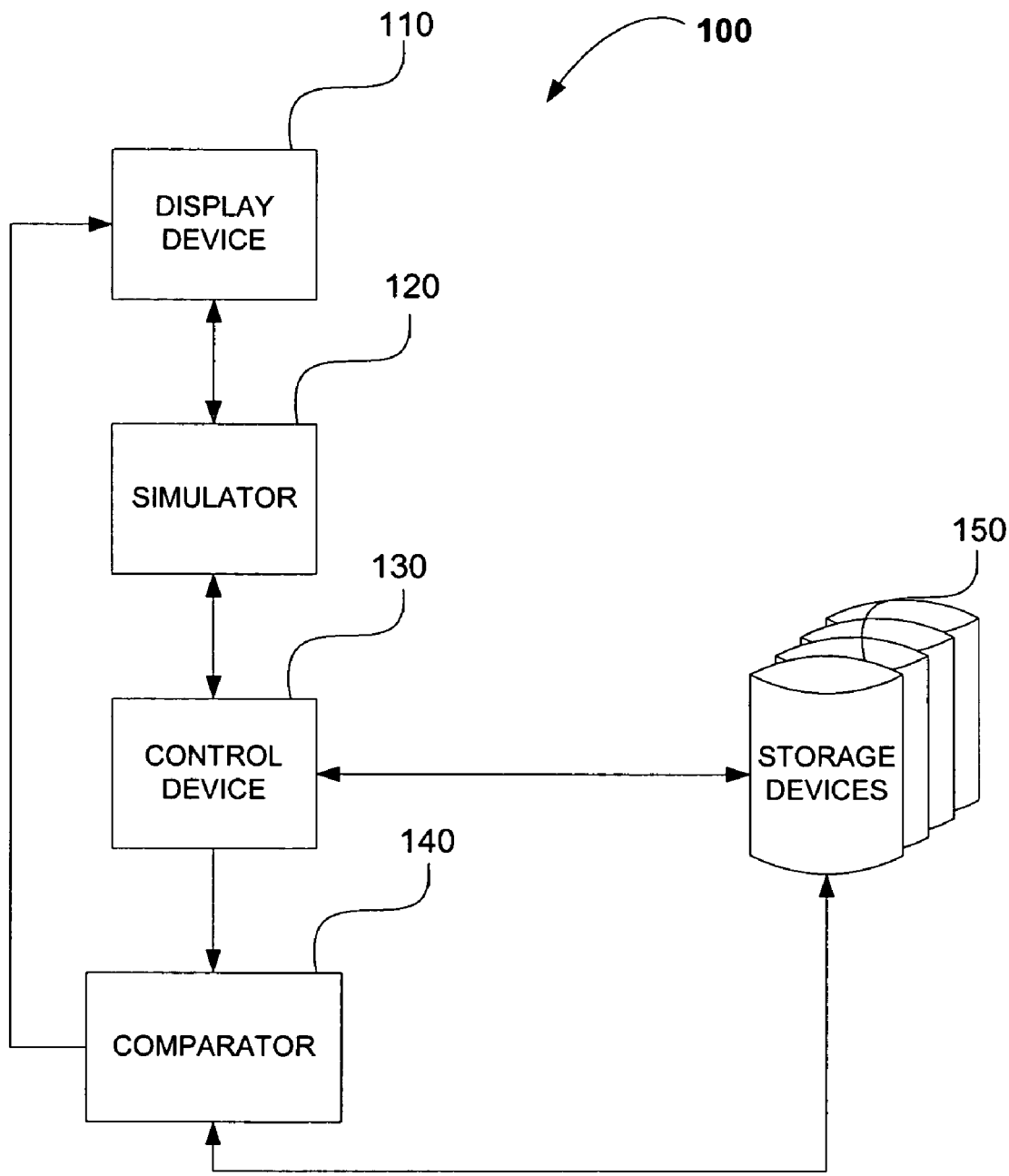
FIG. 1. is a block diagram illustrating an example automatic driver evaluation system in accordance with various embodiments of the present invention.

Embodiments of the present invention provide a system and method for automatic driver evaluation. Referring now to the drawings, and more particularly, to FIG. 1, there is shown an automatic driver evaluation system, generally designated 100, for monitoring and evaluating the capability of a motor vehicle driver which incorporates various embodiments of the present invention. System 100 includes at least one display device 110, at least one simulator 120, at least one control device 130, at least one comparator 140, and at least one storage device 150, each as described in reference to FIG. 1.

In one example of the present invention, the display device 110 receives data from the simulator 120 to display a simulated environment. In one example of the present invention, the simulated environment is an urban driving course. The display device 110 may include a plurality of video devices arranged in a semi-circle to give the user a simulated view similar to that of a real vehicle such as a car. In another example of the present invention, the display device 110 may include a plurality of ceiling mounted digital projectors that display roadway images on a plurality of screens thereby providing at least 135° field of view. In yet another example of the present invention, the display device 110 may include a computer monitor.

The simulator 120 then initiates a predetermined driving route for a user belonging to a predetermined demography and the display device 110 displays the predetermined route in the simulated environment. The predetermined driving route can be one of a number of driver testing route stored within the storage device 150 which can be downloaded into the simulator 120.

The simulator 120 updates the predetermined route by reading the input signals provided by the user via user input devices (not shown) connected to the control device 130. (e.g., Raydon Virtual Driver™, Raydon Corporation, Daytona Beach, Fla.; STISIM Drive, Systems Technology, Inc., Hawthorne, Calif.). The control device 130 uses these inputs signals to determine the position of the simulated vehicle driven by the user in the simulated environment by sending signals representative of the user's driving actions. The simulator 120 receives signals (e.g., digitized or analog) from the control device 130 and accordingly applies the position information from the control device 130 to the new position of the simulated vehicle, and initiates signals to drive the display device 110 to display the updated position of the simulated vehicle on the predetermined driving route in the simulated environment. Thus, the user is presented with real-time feedback that is personalized according to the user's own individual performance and what the user encounters in the simulated environment. The location information provided by the control device 130 is further used to record the paths of the simulated vehicles that the user has driven through the predetermined driving route for a predetermined time period. The length of the predetermined time period is long enough to test the ability to drive a typical length of drive without losing concentration for a given demography group. In one example embodiment of the present invention, the predetermined time period is at least 30 minutes for user demographic of 60 years or older. Further, the control device 130 determines the performance errors of the user based on the actions required by the driving tasks in the predetermined driving route.

The data from the control device 130 representative of the user's driving actions is also sent to the comparator 140. The comparator 140 utilizes this data to compare with threshold values of the predetermined driving route to determine the performance outcome of the driving test and stores the results back in the storage device 150. Display device 110 receives data from comparator 140 to display the performance outcome of the driving test.

In this fashion, the simulation system 100 of the present invention allows the user to drive a simulated vehicle through a predetermined driving route in a simulated environment, which contains traffic lights, and other vehicles, which can be programmed to create traffic situations in the simulated environment, to which the user must respond.

Figure 2:
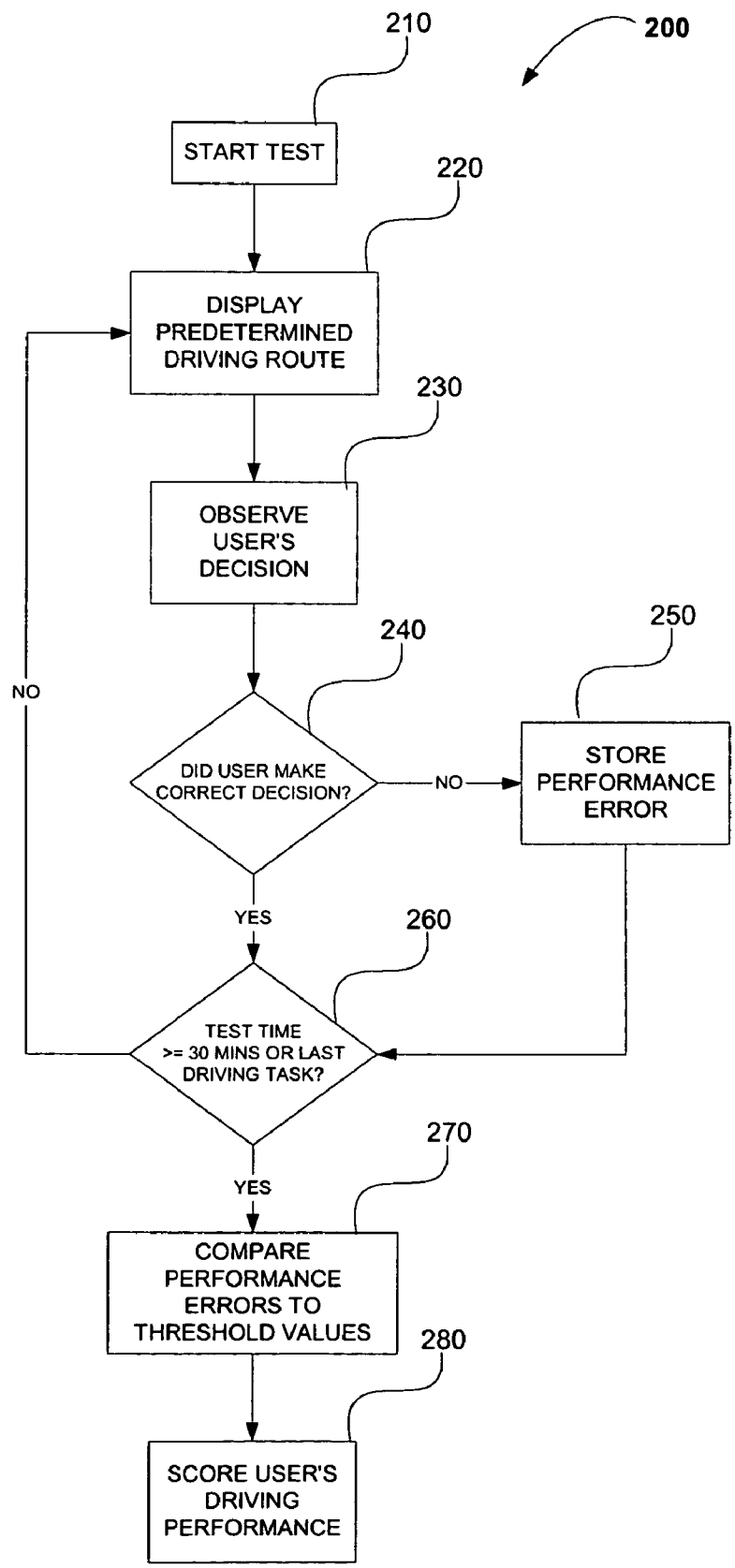
FIG. 2. is a flow chart illustrating a method for automatic evaluation of driver capabilities in accordance with various embodiments of the present invention.

FIG. 2, generally at 200, illustrates an exemplary method in accordance with an embodiment of the present invention. At step 210, simulator 120 sends data corresponding to a predetermined route in a simulated environment to display device 110. The data for the predetermined driving route includes driving tasks designed to evaluate driving capabilities of a specific demography of users for a predetermined time period. The length of the predetermined time period is long enough to test the ability to drive a typical length of drive without losing concentration for a given demography group. In an example of the present invention, the predetermined time period is at least 30 minutes. In another example of the present invention, the predetermined time period is at least 60 minutes. In yet another example of the present invention, the predetermined time period is at least 90 minutes. In one example of the present invention, the demography of users is at least 60 years. In another example of the present invention, the demography of users is 18 years or younger. In an example of the present invention, the demography of users includes different groups with certain medical conditions, for example, neurological conditions including strokes, dementia; post-operative conditions affecting either cognition (e.g., coronary artery bypass surgery) or sensory/motor function and/or cognition (e.g., total hip and total knee replacement surgery). In another example of the present invention, the demography of users includes truck drivers and other long distance drivers. In yet another example of the present invention, the demography of users includes short distance drivers.

In one embodiment, the predetermined driving route can be one of a number of driver testing route that includes various driving tasks, such as: (1) Right Turns-Driver Required to Stop on Red Light, (2) Left Turns-No Oncoming or Cross Traffic, (3) Left Turns-Driver Must Negotiate Oncoming Traffic (unprotected turns), (4) Green Lights-Driver has Throughway, (5) Stop-Signs-Driver Required to Stop, (6) Reduction in Number of Lanes-Driver Required to Change Lane, (7) Pedestrians Jaywalking-Driver Required to Slow Speed to Avoid Collision, (8) Cars Pull into Path of Driver-Driver Required to Slow Speed to Avoid Collision, (9) Speed Limit Changes-Driver Needs to Change Speeds, and the like. Table 1 illustrates an example of the predetermined driving route that includes various driving tasks and the frequencies at which the driving tasks occur. At step 220, the predetermined driving route is displayed on display device 110. The user's decision in response to the driving tasks presented in the predetermined driving route is observed at step 230.

TABLE 1

Simulator Driving Maneuvers

| Driving Maneuver | Frequency |
| --- | --- |
| Right Turns-Driver Required to Stop on Red Light | 5 |
| Left Turns-No Oncoming or Cross Traffic | 2 |
| Left Turns-Driver Must Negotiate Oncoming Traffic (unprotected turns) | 5 |
| Green Lights-Driver has Throughway | 7 |
| Stop-Signs-Driver Required to Stop | 3 |
| Reduction in Number of Lanes-Driver Required to Change Lane | 2 |
| Pedestrians Jaywalking-Driver Required to Slow Speed to Avoid Collision | 2 |
| Cars Pull into Path of Driver-Driver Required to Slow Speed to Avoid Collision | 3 |
| Speed Limit Changes-Driver Needs to Change Speeds | 13 |

At decision step 240, control device 130 determines if the user made a correct decision in comparison to the required decision by the driving task presented in the predetermined driving route. In an example of the present invention, the control device 130 performance errors of user driving actions in comparison to the actions required by the driving tasks are determined. In an example of the present invention, the performance errors include Level 1 errors (e.g., hazardous errors), Level 2 errors (e.g., traffic violations), Level 3 errors (e.g., rule violations), and the like. Exemplary hazardous errors include crash involving pedestrian, crash involving building, crash involving vehicle, driving in the lane of oncoming traffic, turning from the wrong lane, unable to maintain lane position, and the like. Exemplary traffic violations include running red light, running stop sign, speeding, driving at a speed of at least 10 miles per hour less than the posted speed limit, stopping without reason, straddling lane for at least 6 seconds, and the like. Exemplary rule violations include failing to turn, turning in direction opposite of command, poor control of vehicle during divided attention task, and the like. Table 2 illustrates an example of performance errors of a user while executing a driving task presented in the predetermined driving route. If the user decision is incorrect, performance error is stored at step 250. If the user decision is correct, then, at decision step 260, the simulator determines if the user has performed the last driving task in the predetermined driving route. If the user has not performed the last driving task, then, at step 220, display corresponding to the user's position in the predetermined driving route is updated.

TABLE 2

Performance errors of a user

| Level 1 Errors | Level 2 Errors | Level 3 Errors |
| --- | --- | --- |
| Crash (involving pedestrian, building or vehicle) | Running red light or stop sign | Failing to turn |
| Driving in the lane of oncoming traffic | Speeding | Turning in direction opposite of command |
| Turning from the wrong lane | Driving too slow (10 MPH or more < posted speed limit) | Poor control of vehicle during divided attention task |
| Unable to maintain lane position | Stopping without reason | |
| | Straddling lane > 6 seconds | |

If the user has performed the last driving task, then, at step 270, performance errors are compared to at least one threshold value. In an example of the present invention, the threshold values include at least one hazardous error, at least two traffic violations, and at least one rule violations and at least one traffic violations. At step 280, user driving performance outcome is scored based on the comparison of the performance errors with the threshold values and the score is displayed at the completion of all driving tasks in the predetermined driving route. The score indicates the driving capabilities of a user in a simulated environment when presented with various driving tasks for a predetermined time period. In an example of the present invention, the score is displayed as pass or fail. In an example of the present invention, the score is displayed (and/or reported) as pass with restrictions. In particular, a user can pass with restrictions based on the number of errors the user makes and/or user's clinical information such as information relating to medications, if any, the user has been taking. In yet another example of the present invention, the score is reported as a detailed report. A report could be used in a subsequent evaluation for fitness to drive. In another example, the invention would be helpful in rehab situations to assess driving ability to determine when patients would be able to resume driving. For example, the invention would be helpful in rehab situations to assess driving ability of patients who may suffer from temporary loss or impairment of proprioception after having undergone total hip or total knee replacement surgery, and patients who may have difficulty applying correct amount of force on pedals in a vehicle after having undergone total hip or total knee replacement surgery or have suffered at least one stroke. In another example, the invention could be helpful in rehab situations to assess driving ability of patients who may suffer from cognitive impairments from vascular events after having undergone coronary artery bypass surgery. In yet another example, the invention would be helpful in rehab situations to assess driving ability of patients who may suffer from impaired memory and orientation, limitations of concentration, planning and judgment as a result of dementia. Table 3 illustrates an example of a form for detailed report that includes elements of the predetermined driving route that are necessary to conduct the assessment of driving fitness of a driver.

TABLE 3

Report of an assessment of driving fitness of a driver in a predetermined driving route

| | | Insight (How well compared to others your own age) | | | | | | | |
| --- | --- | --- | --- | --- | --- | --- | --- | --- | --- |
| | | A lot better | Little better | Same | Little worse | A lot better | Name Date | | |
| | (25 mph) First int. with stop sign, no turn (RR?) | YES | NO | V/P | P/A | | DWL | Straddle Ticket | Crash |
| | (35 mph) Curve to the left in neighborhood | YES | NO | V/P | P/A | | DWL | Straddle Ticket | Crash |
| | (45 mph) | YES | NO | V/P | P/A | | DWL | Straddle Ticket | Crash |
| | (35 mph) Lane widens to 4 & neighborhood comes in | YES | NO | V/P | P/A | | DWL | Straddle Ticket | Crash |
| X | DA & city pops up | YES | NO | V/P | P/A | | DWL | Straddle Ticket | Crash |

TABLE 3-continued

Report of an assessment of driving fitness of
a driver in a predetermined driving route

| | | Insight (How well compared to others your own age) | | | | | Name Date | | | |
|---|---|---|---|---|---|---|---|---|---|---|
| | | A lot better | Little better | Same | Little worse | A lot better | | | | |
| X | 3rd int. in Big Sample City-left (W N) | YES | NO | V/P | P/A | TWL | | | Ticket | Crash |
| | (25 mph) houses on both sides | YES | NO | V/P | P/A | | DWL | Straddle | Ticket | Crash |
| X | Right turn at stop light, light changes (W N) (RR?) | YES | NO | V/P | P/A | TWL | | | Ticket | Crash |
| X | Pedestrian sign and Pedestrians | YES | NO | V/P | P/A | | DWL | Straddle | Ticket | Crash |
| | (35 mph) | YES | NO | V/P | P/A | | DWL | Straddle | Ticket | Crash |
| X | Light changes, no turns, 4-way int. (RR?) | YES | NO | V/P | P/A | | DWL | Straddle | Ticket | Crash |
| X | 4-way int., left turn, car stream (W N) | YES | NO | V/P | P/A | TWL | | | Ticket | Crash |
| X | Light changes, right (RR?) | YES | NO | V/P | P/A | TWL | | | Ticket | Crash |
| X | DA | YES | NO | V/P | P/A | | DWL | Straddle | Ticket | Crash |
| | (35 mph) Barrels, road narrows sign | YES | NO | V/P | P/A | | DWL | Straddle | Ticket | Crash |
| X | 4-way int., no turns | YES | NO | V/P | P/A | | DWL | Straddle | Ticket | Crash |
| X | Left curve | YES | NO | V/P | P/A | | DWL | Straddle | Ticket | Crash |
| | (45 mph) City comes up | YES | NO | V/P | P/A | | DWL | Straddle | Ticket | Crash |
| X | 4-way int., left turn (W N) | YES | NO | V/P | P/A | TWL | | | Ticket | Crash |
| X | Left curve | YES | NO | V/P | P/A | | DWL | Straddle | Ticket | Crash |
| X | Road widens to 4 lanes | YES | NO | V/P | P/A | | DWL | Straddle | Ticket | Crash |
| X | 4-way stop sign, 2 blue trucks approach, right turn(RR?) | YES | NO | V/P | P/A | TWL | | | Ticket | Crash |
| X | Pedestrian with blue pick-up | YES | NO | V/P | P/A | | DWL | Straddle | Ticket | Crash |
| X | Car pulls out of house | YES | NO | V/P | P/A | | DWL | Straddle | Ticket | Crash |
| X | Car pulls out of gas station | YES | NO | V/P | P/A | | DWL | Straddle | Ticket | Crash |
| X | DA | YES | NO | V/P | P/A | | DWL | Straddle | Ticket | Crash |
| | (35 mph) | YES | NO | V/P | P/A | | DWL | Straddle | Ticket | Crash |
| | (25 mph) City comes in | YES | NO | V/P | P/A | | DWL | Straddle | Ticket | Crash |
| X | 4-way int., car stream, left turn (W N) | YES | NO | V/P | P/A | TWL | | | Ticket | Crash |
| X | 4-way int., light changes, right turn (W N) (RR?) | YES | NO | V/P | P/A | TWL | | | Ticket | Crash |
| | (45 mph) | YES | NO | V/P | P/A | | DWL | Straddle | Ticket | Crash |
| X | car pulls out of gas station | YES | NO | V/P | P/A | | DWL | Straddle | Ticket | Crash |
| X | 4-way int., car stream, left turn (W N) | YES | NO | V/P | P/A | TWL | | | Ticket | Crash |

TABLE 3-continued

Report of an assessment of driving fitness of a driver in a predetermined driving route Insight (How well compared to others your own age)

| | | A lot better | Little better | Same | Little worse | A lot better | | Name Date | | |
|---|---|---|---|---|---|---|---|---|---|---|
| X | 4-way int., light changes, no turns (RR?) | YES | NO | V/P | P/A | | DWL | Straddle | Ticket | Crash |
| | (25 mph) | YES | NO | V/P | P/A | | DWL | Straddle | Ticket | Crash |
| X | 4-way int., stop sign, pedestrians, right turn (W N) (RR?) | YES | NO | V/P | P/A | TWL | | | Ticket | Crash |
| X | Left curve | YES | NO | V/P | P/A | | DWL | Straddle | Ticket | Crash |
| X | Left DA, lane narrows | YES | NO | V/P | P/A | | DWL | Straddle | Ticket | Crash |
| | (45 mph) Barrels | YES | NO | V/P | P/A | | DWL | Straddle | Ticket | Crash |
| X | 4-way int., no turns | YES | NO | V/P | P/A | | DWL | Straddle | Ticket | Crash |
| X | 4-way int., left turn (W N) | YES | NO | V/P | P/A | TWL | | | Ticket | Crash |
| X | 4-way int., car stream, left turn (W N) | YES | NO | V/P | P/A | TWL | | | Ticket | Crash |
| X | 4-way int., light changes, no turns (RR?) | YES | NO | V/P | P/A | | DWL | Straddle | Ticket | Crash |
| X | 4-way int., car stream, right turn (W N) (RR?) | YES | NO | V/P | P/A | TWL | | | Ticket | Crash |
| X | 4-way int., light changes, no turns (RR?) | YES | NO | V/P | P/A | | DWL | Straddle | Ticket | Crash |
| X | 4-way int., car stream, left turn (W N) | YES | NO | V/P | P/A | TWL | | | Ticket | Crash |
| X | 4-way int., right turn (W N) (RR?) | YES | NO | V/P | P/A | TWL | | | Ticket | Crash |
| | (25 mph) | YES | NO | V/P | P/A | | DWL | Straddle | Ticket | Crash |
| X | Pedal problems? | YES | NO | V/P | P/A | | | | | |

Figure 3:
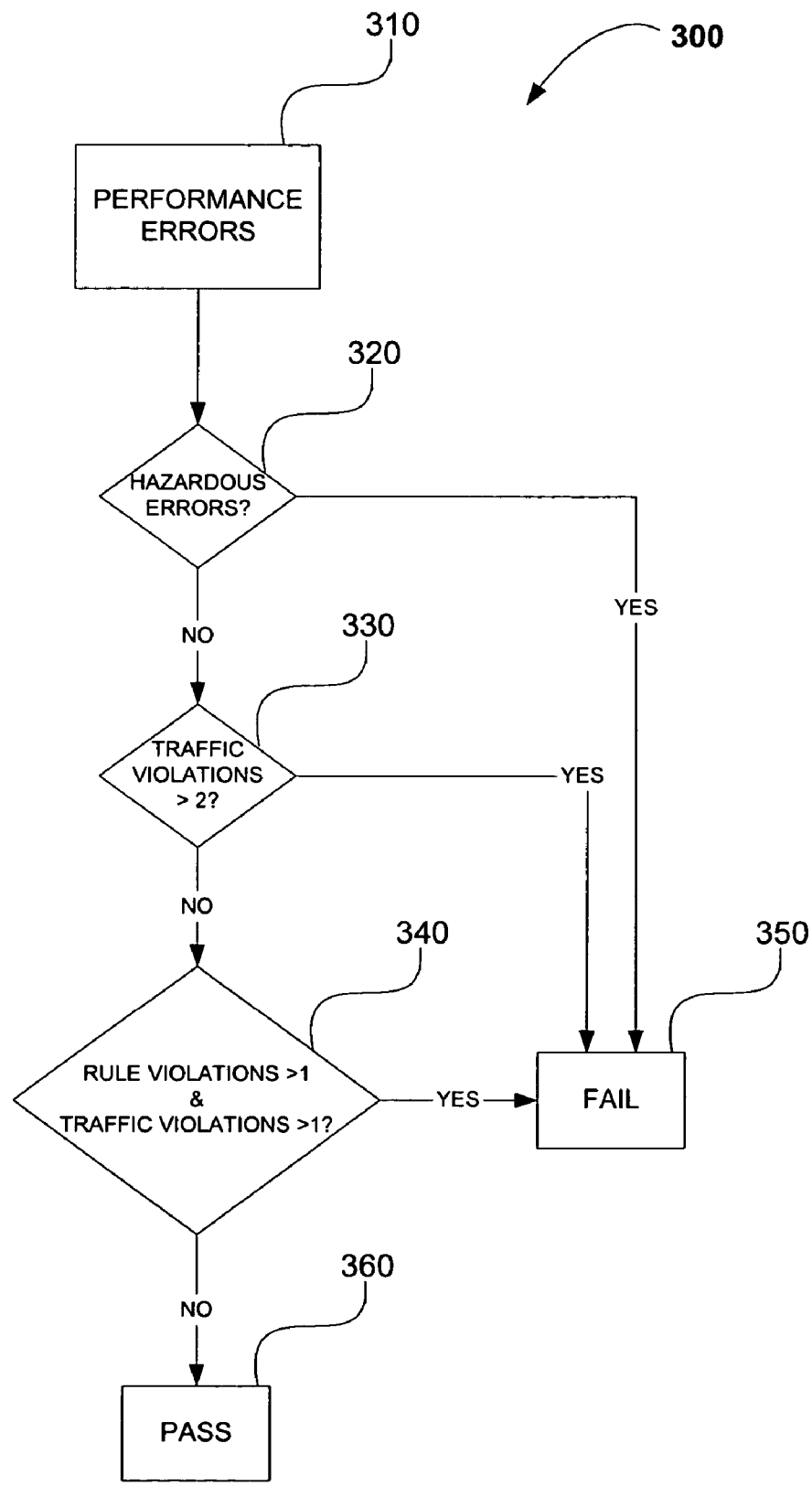
FIG. 3. is a flow chart illustrating a method of scoring driving performance outcome in accordance with various embodiment of the present invention.

FIG. 3, generally at 300, illustrates an exemplary method of scoring driving performance outcome in accordance with an embodiment of the present invention. At step 310, comparator 140 receives performance errors from control device 130. At decision step 320, comparator 140 determines if at least one performance error is a hazardous error. If at least one performance error is a hazardous error, the driving performance outcome of the user is scored as fail. If at least one performance error is not a hazardous error, then, at decision step 330, comparator 140 determines if the performance errors are at least two traffic violations. If the performance errors are at least two traffic violations, the driving performance outcome of the user is scored as fail. If the performance errors are not at least two traffic violations then, at decision step 340, comparator 140 determines if the performance errors are at least one rule violation and at least one traffic violation. If the performance errors are at least one rule violation and at least one traffic violation, the driving performance outcome of the user is scored as fail. If the performance errors are at least one rule violation and at least one traffic violation, then, at step 360, the driving performance outcome of the user is scored as pass.

Parts of the present invention and corresponding detailed description are presented in terms of software, computer programs, or algorithms. Software includes symbolic representations of operations or steps stored in the form of data bits within a computer memory. An algorithm is a sequence of steps leading to a desired result(s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system's memories or registers or other such information storage, transmission or display devices.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing from the spirit and scope of the invention. The described embodiments are to be considered in all respects only as illustrative and not restrictive.

We claim:

1. A method of automatically evaluating driving capabilities of a user using a computer system in a simulated environment, the method comprising the steps of: providing a driving route, selected from a plurality of driving routes, based on a demography associated with the user, wherein the selected driving route includes a plurality of predetermined driving tasks and a predetermined frequency at which the plurality of driving tasks occur;
displaying the selected driving route;
observing simulated driving performance of the user on the selected driving route for a predetermined time period, wherein the driving performance comprises the user's decisions in response to the plurality of driving tasks presented in the selected driving route, and wherein the predetermined time period is based on the demography associated with the user;
comparing the user's decisions to a required decision for one or more of the plurality of driving tasks presented in the selected driving route;
recording performance errors made by the user while performing the simulated drive, wherein the performance errors are grouped into types; and
comparing the performance errors to at least one threshold value for one or more of the types of performance errors to determine fitness to drive based on the performance errors.

2. The method according to claim 1, further comprising the step of:
displaying the performance outcome as fail if at least one performance error is a hazardous error.

3. The method according to claim 1, further comprising the step of:
displaying the performance outcome as fail if the performance errors are at least two traffic violations.

4. The method according to claim 1, further comprising the step of:
displaying the performance outcome as fail if the performance errors are at least one rule violation and at least one traffic violations.

5. The method according to claim 1, wherein the driving tasks comprise
stopping on red light when executing right turns, left turns when there is no oncoming or cross traffic, left turns when there is oncoming traffic, driver has throughway during green lights, driver required to stop at stop-signs, driver required to change lane when there is a reduction in number of lanes, driver required to slow speed to avoid collision when pedestrians are jaywalking, driver required to slow speed to avoid collision when cars pull into path of driver, and driver required to change speeds when speed limit changes.

6. The method according to claim 1, wherein the types of performance errors include hazardous errors, wherein the hazardous errors include one or more of crash involving pedestrian, crash involving building, crash involving vehicle, driving in the lane of oncoming traffic, turning from the wrong lane, and unable to maintain lane position.

7. The method according to claim 1, wherein the types of performance errors include traffic violations, wherein traffic violations include one or more of running red light, running stop sign, speeding, driving at a speed of at least 10 miles per hour less than the posted speed limit, stopping without reason, and straddling lane for at least 6 seconds.

8. The method according to claim 1, wherein the types of performance errors include rule violations, wherein rule violations include one or more of failing to turn, turning in direction opposite of command, and poor control of vehicle during divided attention task.

9. The method according to claim 1, wherein the errors made by the user while performing the simulated drive is determined for at least 30 minutes.

10. The method according to claim 1, wherein the errors made by the user while performing the simulated drive is determined until the completion of the last driving task in the selected driving route.

11. The method according to claim 1, wherein the selected driving route includes at least one urban course.

12. The method according to claim 1, wherein the demography is based on age.

13. The method of claim 12, wherein the demography is for one of drivers over a certain age, and drivers under a certain age.

14. The method according to claim 1, wherein the demography is based on one or more medical conditions.

15. The method according to claim 1, wherein the demography is based on particular types of driving a driver is expected to perform.

16. The method of claim 1, wherein the predetermined time period is sufficient to test the user's ability to drive a typical length of drive without losing concentration for the demography associated with the user.

17. The method of claim 1, wherein the at least one threshold value includes at least one hazardous error, at least two traffic violations, or at least one rule violation and at least one traffic violation.

18. The method of claim 1, wherein the types of performance errors include hazardous errors, traffic violations, and rule violations.

19. A system for automatically evaluating driving capabilities of a user in a simulated environment comprising:
a display device configured to display a selected driving route;
a control device configured to provide the selected driving route, selected from a plurality of driving routes, based on a demography associated with the user and to observe simulated driving performance of the user on the selected driving route for a predetermined time period, wherein the selected driving route includes a plurality of predetermined driving tasks and a predetermined frequency at which the plurality of driving tasks occur, wherein the driving performance comprises the user's decisions in response to the plurality of driving tasks presented in the selected driving route, and wherein the predetermined time period is based on the demography associated with the user;
a processor for comparing the user's decisions to a required decision for one or more of the plurality of driving tasks presented in the selected driving route;
a storage device configured to store performance errors made by the user while performing the simulated drive, wherein the performance errors are grouped into types; and
a comparator configured to compare the performance errors to at least one threshold value to determine fitness to drive based on the performance errors.

20. The system according to claim 19, further comprising a plurality of input devices for controlling the position of a simulated vehicle in the simulated environment.

21. The system according to claim 19, wherein the input device comprises accelerator pedal, brake pedals, adjustable seats, throttle, dashboard, and steering wheel.

22. The system according to claim 19, wherein the display unit provides at least a 135 degree angle field of view.

23. The system according to claim 19, wherein the simulated environment is a driving cab.

24. The system according to claim 19, wherein the simulated environment comprises at least one desk, at least one chair, modular steering, modular dash, and at least one modular pedal.

25. The system according to claim 19, wherein the display unit comprises a ceiling mounted digital projector, and at least one screen.

26. The system according to claim 19, wherein the display unit comprises a computer monitor.

27. The system of claim 19, wherein the demography is based on age.

28. The system of claim 27, wherein the demography is for one of drivers over a certain age, and drivers under a certain age.

29. The system of claim 19, wherein the demography is based on one or more medical conditions.

30. The system of claim 19, wherein the demography is based on particular types of driving a driver is expected to perform.

31. The system of claim 19, wherein the predetermined time period is sufficient to test the user's ability to drive a typical length of drive without losing concentration for the demography associated with the user.

32. The system of claim 19, wherein the at least one threshold value includes at least one hazardous error, at least two traffic violations, or at least one rule violation and at least one traffic violation.

33. A non-tangible computer-readable medium having a computer program, the computer program comprising computer instructions for configuring a computer to perform the acts of automatically evaluating driving capabilities of a user, the acts comprising:
   providing a driving route, selected from a plurality of driving routes, based on a demography associated with the user, wherein the selected driving route includes a plurality of predetermined driving tasks and a predetermined frequency at which the plurality of driving tasks occur;
   displaying the selected driving route,
   observing simulated driving performance of the user on the selected driving route for a predetermined time period, wherein the driving performance comprises the user's decisions in response to the plurality of driving tasks presented in the selected driving route, and wherein the predetermined time period is based on the demography associated with the user;
   comparing the user's decisions to a required decision for one or more of the plurality of driving tasks presented in the selected driving route;
   recording performance errors made by the user while performing the simulated drive, wherein the performance errors are grouped into types; and
   comparing the performance errors to at least one threshold value to determine fitness to drive based on the performance errors.

34. The computer-readable medium of claim 33, wherein the instructions for performing the act of comparing the performance errors to at least one threshold value further comprise the instructions for performing the act of:
   displaying the performance outcome as fail if at least one performance error is a hazardous error.

35. The computer-readable medium of claim 33, wherein the instructions for performing the act of comparing the performance errors to at least one threshold value further comprise the instructions for performing the act of:
   displaying the performance outcome as fail if the performance errors are at least two traffic violations.

36. The computer-readable medium of claim 33, wherein the instructions for performing the act of comparing the performance errors to at least one threshold value further comprise the instructions for performing the act of:
   displaying the performance outcome as fail if the performance errors are at least one rule violations and at least one traffic violations.

37. The computer-readable medium of claim 33, wherein the predetermined time period is sufficient to test the user's ability to drive a typical length of drive without losing concentration for the demography associated with the user.

38. The computer-readable medium of claim 33, wherein the at least one threshold value includes at least one hazardous error, at least two traffic violations, or at least one rule violation and at least one traffic violation.

39. The computer-readable medium of claim 33, wherein the types of performance errors include hazardous errors, traffic violations, and rule violations.

* * * * *